(12) United States Patent
Santi

(10) Patent No.: US 8,215,680 B2
(45) Date of Patent: Jul. 10, 2012

(54) THREADED JOINT WITH HIGH RADIAL LOADS AND DIFFERENTIALLY TREATED SURFACES

(75) Inventor: Nestor J. Santi, Buenos Aires (AR)

(73) Assignee: Tenaris Connections AG, Kingstown (VC)

( * ) Notice: Subject to any disclaimer, the term of this patent is extended or adjusted under 35 U.S.C. 154(b) by 313 days.

(21) Appl. No.: 12/673,833

(22) PCT Filed: Aug. 21, 2008

(86) PCT No.: PCT/EP2008/060935
§ 371 (c)(1),
(2), (4) Date: Feb. 17, 2010

(87) PCT Pub. No.: WO2009/027308
PCT Pub. Date: Mar. 5, 2009

(65) Prior Publication Data
US 2011/0042946 A1    Feb. 24, 2011

(30) Foreign Application Priority Data

Aug. 24, 2007 (EP) ................................ 07114961

(51) Int. Cl.
*F16L 19/00* (2006.01)
(52) U.S. Cl. ................ 285/334; 285/333; 285/422
(58) Field of Classification Search ........... 285/333, 285/334, 422
See application file for complete search history.

(56) References Cited

U.S. PATENT DOCUMENTS

| | | |
|---|---|---|
| 1,671,458 A | 5/1928 | Wilson |
| 1,999,706 A | 4/1935 | Spang |
| 2,075,427 A | 3/1937 | Church |
| 2,211,173 A | 8/1940 | Shaffer |
| 2,487,241 A | 11/1949 | Hilton |
| 2,631,871 A | 3/1953 | Stone |
| 2,992,613 A | 7/1961 | Bodine |
| 3,054,628 A | 9/1962 | Hardy et al. |
| 3,307,860 A | 3/1967 | Blount et al. |
| 3,489,437 A | 1/1970 | Duret |
| 3,572,777 A | 3/1971 | Blose et al. |
| 3,810,793 A | 5/1974 | Heller |
| 3,889,989 A | 6/1975 | Legris et al. |

(Continued)

FOREIGN PATENT DOCUMENTS

AT    388791 B    8/1989

(Continued)

OTHER PUBLICATIONS

U.S. Appl. No. 11/546,974, filed Nov. 5, 2003 and its ongoing prosecution history, including without limitation Office Actions, Amendments, Remarks, and any other potentially relevant documents.

(Continued)

*Primary Examiner* — David E Bochna
(74) *Attorney, Agent, or Firm* — Knobbe, Martens, Olson & Bear, LLP

(57) ABSTRACT

A threaded joint has an interference between thread roots of the pin and thread crests of the box of between 1% and 5% of the average thickness of the connection, and a root to load flank radius R in the range of 0.2 mm and 0.4 mm. In other embodiments the interference can be between thread roots of the box and thread crests of the pin. The threaded joint can also have a surface treatment that includes shot peening applied to the beginning and end of the threaded zone of the pin.

14 Claims, 3 Drawing Sheets

U.S. PATENT DOCUMENTS

| | | | |
|---|---|---|---|
| 4,299,412 | A | 11/1981 | Parmann |
| 4,373,750 | A | 2/1983 | Mantelle et al. |
| 4,384,737 | A | 5/1983 | Reusser |
| 4,406,561 | A | 9/1983 | Ewing |
| 4,475,839 | A | 10/1984 | Strandberg |
| 4,570,982 | A | 2/1986 | Blose et al. |
| 4,591,195 | A | 5/1986 | Chelette et al. |
| 4,602,807 | A | 7/1986 | Bowers |
| 4,623,173 | A | 11/1986 | Handa et al. |
| 4,662,659 | A | 5/1987 | Blose et al. |
| 4,688,832 | A | 8/1987 | Ortloff et al. |
| 4,706,997 | A | 11/1987 | Carstensen |
| 4,762,344 | A | 8/1988 | Perkins et al. |
| 4,844,517 | A | 7/1989 | Beiley et al. |
| 4,856,828 | A | 8/1989 | Kessler et al. |
| 4,955,645 | A | 9/1990 | Weems |
| 4,958,862 | A | 9/1990 | Cappelli et al. |
| 4,988,127 | A | 1/1991 | Cartensen |
| 5,007,665 | A | 4/1991 | Bovisio et al. |
| 5,067,874 | A | 11/1991 | Foote |
| 5,137,310 | A | 8/1992 | Noel et al. |
| 5,180,008 | A | 1/1993 | Aldridge et al. |
| 5,348,350 | A | 9/1994 | Blose et al. |
| 5,515,707 | A | 5/1996 | Smith |
| 5,712,706 | A | 1/1998 | Castore et al. |
| 5,794,985 | A | 8/1998 | Mallis |
| 5,810,401 | A | 9/1998 | Mosing et al. |
| 6,070,912 | A | 6/2000 | Latham |
| 6,173,968 | B1 | 1/2001 | Nelson et al. |
| 6,349,979 | B1 | 2/2002 | Noel et al. |
| 6,412,831 | B1 | 7/2002 | Noel et al. |
| 6,447,025 | B1 | 9/2002 | Smith |
| 6,481,760 | B1 | 11/2002 | Noel et al. |
| 6,494,499 | B1 | 12/2002 | Galle, Sr. et al. |
| 6,550,822 | B2 | 4/2003 | Mannella et al. |
| 6,557,906 | B1 | 5/2003 | Carcagno |
| 6,752,436 | B1 | 6/2004 | Verdillon |
| 6,755,447 | B2 | 6/2004 | Galle, Jr. et al. |
| 6,764,108 | B2 | 7/2004 | Ernst et al. |
| 6,851,727 | B2 | 2/2005 | Carcagno et al. |
| 6,857,668 | B2 | 2/2005 | Otten et al. |
| 6,905,150 | B2 | 6/2005 | Carcagno et al. |
| 6,921,110 | B2 | 7/2005 | Morotti et al. |
| 6,991,267 | B2 | 1/2006 | Ernst et al. |
| 7,014,223 | B2 | 3/2006 | Della Pina et al. |
| 7,066,499 | B2 | 6/2006 | Della Pina et al. |
| 7,108,063 | B2 | 9/2006 | Carstensen |
| 7,255,374 | B2 | 8/2007 | Carcagno et al. |
| 7,431,347 | B2 | 10/2008 | Ernst et al. |
| 7,464,449 | B2 | 12/2008 | Santi et al. |
| 7,475,476 | B2 | 1/2009 | Roussie |
| 7,506,900 | B2 | 3/2009 | Carcagno et al. |
| 7,621,034 | B2 | 11/2009 | Roussie |
| 7,735,879 | B2 | 6/2010 | Toscano et al. |
| 7,753,416 | B2 | 7/2010 | Mazzaferro et al. |
| 2003/0168859 | A1 | 9/2003 | Watts |
| 2004/0118490 | A1 | 6/2004 | Klueh et al. |
| 2004/0118569 | A1 | 6/2004 | Brill et al. |
| 2005/0093250 | A1 | 5/2005 | Santi et al. |
| 2005/0166986 | A1 | 8/2005 | Dell'erba et al. |
| 2006/0006600 | A1 | 1/2006 | Roussie |
| 2006/0273586 | A1 | 12/2006 | Reynolds, Jr. et al. |
| 2007/0039149 | A1 | 2/2007 | Roussie |
| 2008/0303274 | A1 | 12/2008 | Mazzaferro et al. |
| 2010/0181727 | A1 | 7/2010 | Santi et al. |
| 2010/0181761 | A1 | 7/2010 | Santi et al. |
| 2010/0187808 | A1 | 7/2010 | Santi |
| 2011/0008101 | A1 | 1/2011 | Santi et al. |
| 2011/0041581 | A1 | 2/2011 | Santi |
| 2011/0133449 | A1 | 6/2011 | Mazzaferro |
| 2011/0233925 | A1 | 9/2011 | Pina |
| 2011/0233926 | A1 | 9/2011 | Carcagno |
| 2012/0032435 | A1 | 2/2012 | Carcagno |

FOREIGN PATENT DOCUMENTS

| | | |
|---|---|---|
| CA | 2319926 | 7/2008 |
| DE | 3310226 A1 | 10/1984 |
| EP | 0 032 265 | 7/1981 |
| EP | 0 104 720 | 4/1984 |
| EP | 0 159 385 | 10/1985 |
| EP | 0 309 179 | 3/1989 |
| EP | 0 340 385 | 11/1989 |
| EP | 0 989 196 | 3/2000 |
| EP | 1 065 423 | 1/2001 |
| EP | 1 277 848 | 1/2003 |
| EP | 1296088 A1 | 3/2003 |
| EP | 1 362977 | 11/2003 |
| EP | 1705415 A1 | 9/2006 |
| EP | 1726861 A1 | 11/2006 |
| EP | 1554518 B1 | 1/2009 |
| FR | 1 149 513 A | 12/1957 |
| FR | 2 704 042 A | 10/1994 |
| FR | 2 848 282 A1 | 6/2004 |
| GB | 1 398 214 | 6/1973 |
| GB | 1 428 433 | 3/1976 |
| GB | 2 276 647 | 10/1994 |
| GB | 2 388 169 A | 11/2003 |
| JP | 58-187684 | 12/1983 |
| JP | 07-139666 | 5/1995 |
| WO | WO 84/02947 | 8/1984 |
| WO | WO 94/29627 | 12/1994 |
| WO | WO 96/22396 | 7/1996 |
| WO | WO 00/06931 | 2/2000 |
| WO | WO 01/75345 | 10/2001 |
| WO | WO 02/29290 | 4/2002 |
| WO | WO 02/35128 | 5/2002 |
| WO | WO 02/068854 | 9/2002 |
| WO | WO 02/086369 | 10/2002 |
| WO | WO 02/093045 | 11/2002 |
| WO | WO 03/087646 | 10/2003 |
| WO | WO 2004/033951 | 4/2004 |
| WO | WO 2004/053376 | 6/2004 |
| WO | WO 2006/087361 | 4/2006 |
| WO | WO 2007/002576 | 1/2007 |
| WO | WO 2007/017161 | 2/2007 |
| WO | WO 2007/063079 | 6/2007 |
| WO | WO 2008/090411 | 7/2008 |
| WO | WO 2009/000851 | 12/2008 |
| WO | WO 2009/000766 | 1/2009 |
| WO | WO 2009/010507 | 1/2009 |
| WO | WO 2009/027308 | 3/2009 |
| WO | WO 2009/027309 | 3/2009 |
| WO | WO 2009/106623 | 9/2009 |
| WO | WO 2010/122431 | 10/2010 |

OTHER PUBLICATIONS

U.S. Appl. No. 12/665,921, filed Dec. 21, 2009 and its ongoing prosecution history, including without limitation Office Actions, Amendments, Remarks, and any other potentially relevant documents.

U.S. Appl. No. 12/669,177, filed Jan. 14, 2010 and its ongoing prosecution history, including without limitation Office Actions, Amendments, Remarks, and any other potentially relevant documents.

U.S. Appl. No. 12/665,902, filed Dec. 21, 2009 and its ongoing prosecution history, including without limitation Office Actions, Amendments, Remarks, and any other potentially relevant documents.

U.S. Appl. No. 12/920,085, filed Aug. 27, 2010 and its ongoing prosecution history, including without limitation Office Actions, Amendments, Remarks, and any other potentially relevant documents.

U.S. Appl. No. 12/674,800, filed Feb. 23, 2010 and its ongoing prosecution history, including without limitation Office Actions, Amendments, Remarks, and any other potentially relevant documents.

U.S. Appl. No. 12/954,588, filed Nov. 24, 2010 and its ongoing prosecution history, including without limitation Office Actions, Amendments, Remarks, and any other potentially relevant documents.

U.S. Appl. No. 13/072,533, filed Mar. 25, 2011 and its ongoing prosecution history, including without limitation Office Actions, Amendments, Remarks, and any other potentially relevant documents, Della Pina, et al.

U.S. Appl. No. 13/073,917, filed Mar. 28, 2011 and its ongoing prosecution history, including without limitation Office Actions, Amendments, Remarks, and any other potentially relevant documents, Carcagno, et al.

American Petroleum Institute, Specification 5B, Apr. 2008, 15th Edition (Excerpts Only).

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

International Preliminary Report on Patentability dated Feb. 24, 2010 from PCT Application No. PCT/EP2008/060935.

International Written Opinion dated Jan. 14, 2009 from PCT Application No. PCT/EP2008/060935.

International Search Report from PCT Application No. PCT/EP2008/060935, Jan. 14, 2009, 2 pages.

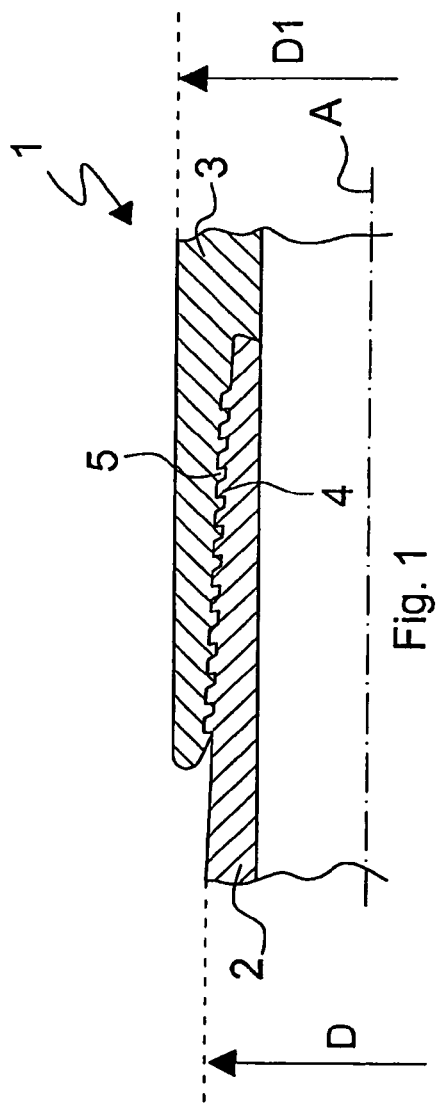
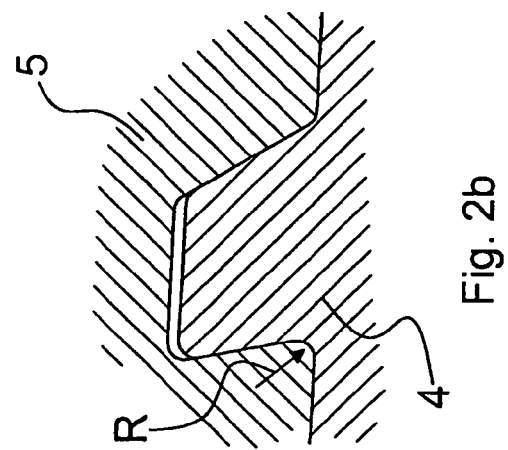
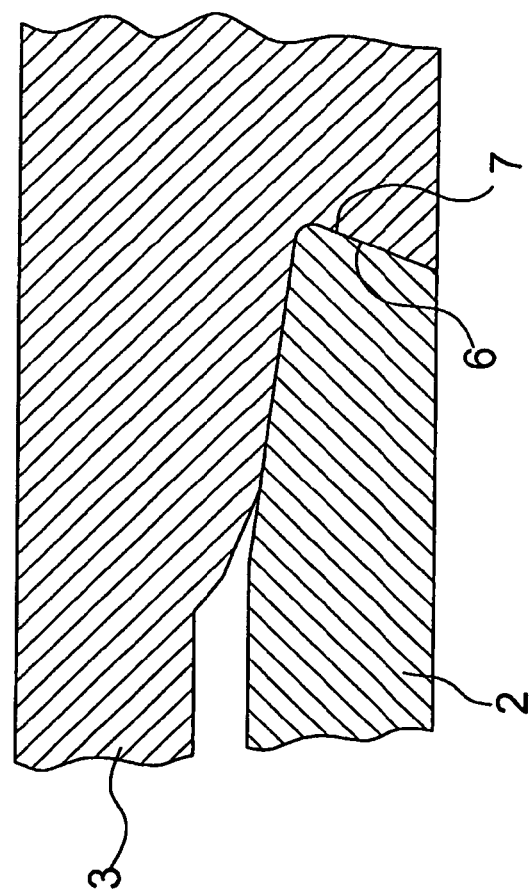

THREADED JOINT WITH HIGH RADIAL LOADS AND DIFFERENTIALLY TREATED SURFACES

CROSS-REFERENCE TO RELATED APPLICATIONS

This application is a U.S. National Phase of PCT International Application No. PCT/EP2008/060935, filed Aug. 21, 2008 and published as WO 2009/027308 on Mar. 5, 2009, which claims priority to European Application No. 07114961.1, filed Aug. 24, 2007. The disclosure of both prior applications is incorporated by reference in their entirety and should be considered a part of this specification.

FIELD OF THE INVENTION

The present invention relates to threaded joints, in particular for connecting tubes of predefined length to create strings used in the hydrocarbon industry especially for use in the field of OCTG (Oil Country Tubular Goods) and line pipes in offshore applications.

BACKGROUND OF THE INVENTION

Searching for oil or more generally hydrocarbons is becoming more demanding in terms of hardware and devices in recent years because oil and gas fields or reservoirs are located deeper or in places difficult to reach. Prospecting and exploiting hydrocarbon fields laying under deep sea has become customary and necessitates hardware which is more resistant to environmental challenges like fatigue and corrosion, which were less important previously.

For extracting oil or gas from fields lying below deep sea off-shore platforms are used which are anchored to the sea bottom and strings are used which are conventionally called risers.

These strings are immerged in the sea and are subject to movements caused by sea streams and surface wave movements. Because of these continuous and periodic movements of the sea the strings do not remain immobile, but are subject to lateral movements of small magnitude which can produce deformations in certain parts of the joint and must withstand loads which induce fatigue stresses in the tubes, with particular respect in the zone of the threaded joint. These stresses tend to cause ruptures in the tubes in the vicinity of the thread and there is a need to improve the fatigue resistance of the threaded joints.

At present, fatigue performance and design for threaded connections for the oil and gas industry are adapted and extrapolated from other engineering fields. There are no specific standards or design/dimensioning specifications yet. Basic concepts can be found in the British Standard/Code of practice BS7608 for Fatigue design and assessment of steel structures, and DNV Class B S-N curve. Solutions have already been proposed in the state of the art to increase fatigue life of the threaded joints.

Document EP1726861 discloses a method for manufacturing a threaded joint for an oil well pipe where micro-shot peening is applied to improve its fatigue fracture strength.

The described method increases fatigue life to achieve the objective by applying shot peening to the threaded joint under specific conditions:

Spraying pressure: 0.4 MPa. Spraying distance: 100 to 150 mm. Spraying time: about 1 sec/cm$^2$. Shot particle material: carbon steel of 0.8 to 1.0% C (HRC60 or more). Particle diameter is selected as shown in Table 4 of this document. It proposes also a combination of carburizing and nitriding treatments which can further improve the fatigue fracture strength.

Still there is room for improvement of threaded joint fatigue life.

SUMMARY OF THE INVENTION

It is therefore an object of the present invention to provide a threaded joint which would overcome the aforementioned drawbacks.

The principal object of the present invention is to provide a joint with increased fatigue life.

The above-mentioned objects are achieved in accordance with the present invention by means of a threaded joint comprising a male threaded tube, defined as pin, and a female threaded tube, defined as box, the pin being provided with a first abutment shoulder, the box being provided with a second abutment shoulder, said first and second abutment shoulders having complementary shape, the pin being adapted to be made up in the box, wherein an interference is provided between the thread roots of either one of the pin or box and the thread crests of the other one of the pin or box measured according to the nominal dimensions of the pin and box, the value of the interference being between 1% and 5% of the average thickness of the pipe wall, wherein there is provided a root to load flank radius R having a value of around ¼ of the thread height, and wherein the joint has a surface treatment comprising shot peening applied to the beginning and end of the threaded zone of the pin.

Another object of the invention is to provide a make up method for the threaded joint of the invention.

According to the claimed invention the objective of improving fatigue resistance of the threaded joint is achieved by a combined action of several features which appear at the end of the make up operation on a joint which has been appropriately designed:

a) provision of high radial loads, the so called hoop loads, as a function of root-to-crest interference to improve fatigue resistance;

b) provision of high shoulder loads to improve fatigue resistance;

c) provision of enlarged root to flank radius R which lowers stress concentration in thread roots; and d) in addition an appropriate surface preparation of the pin and box surface, comprising mainly a shot peening treatment, increases further fatigue resistance of the joint.

The threaded joint of this invention can be made up with the aid of known dopes, liquid or solid lubricants, dope-free systems, etc.

Thanks to the mentioned features in the joint of the invention, tensile-axial loads are transferred through the usual flank to flank contact, since the axial interference is chosen to be within normal standard values used in the industry. On the other side, radial loads in the threaded portion reach high values than normal, which improves fatigue resistance and prolongs operative life of the joint.

These radial loads on the thread mainly depend on radial geometrical interference which is achieved by controlling the various diameters and tolerances that configure a threaded pipe end.

The value of this interference measured according to the nominal dimensions of the pin and box, that is before making up the two members, is not less than 1% of the average thickness of the joint or connection, i.e. the addition of the average thicknesses of pin and box in the case of the lightest weight covered by the design pipe range; and not higher than 5% of the average thickness of the joint, i.e. the addition of the average thicknesses of pin and box in the case of the heaviest weight covered by the design pipe range.

These values of interference assure that the level of stresses in the joint are controlled so as to avoid high stress concentration factors. In the following table, examples of appropriate values of interference are shown in the case of two pipes having different diameter and weight:

| pipe diameter in inches | Weight in lb/ft | interference in % | interference in μm |
|---|---|---|---|
| 9⅝ | 36 | 3% | 370 |
| 13⅜ | 98 | 2% | 360 |

However, other parameters also contribute to achieving the desired radial loads. These parameters are the pipe's diameter and thickness, the type of thread, the properties of the material, like Young's modulus, the surface properties of each member of the connection, etc.

BRIEF DESCRIPTION OF THE DRAWINGS

The foregoing and other objects will become more readily apparent by referring to the following detailed description and the appended drawings in which:

FIG. 1 shows a sectional view on a longitudinal axial plane of the joint in accordance with the present invention;

FIGS. 2a and 2b show enlarged views of a particular of the joint of FIG. 1,

DETAILED DESCRIPTION OF PREFERRED EMBODIMENTS OF THE INVENTION

Figure 3:
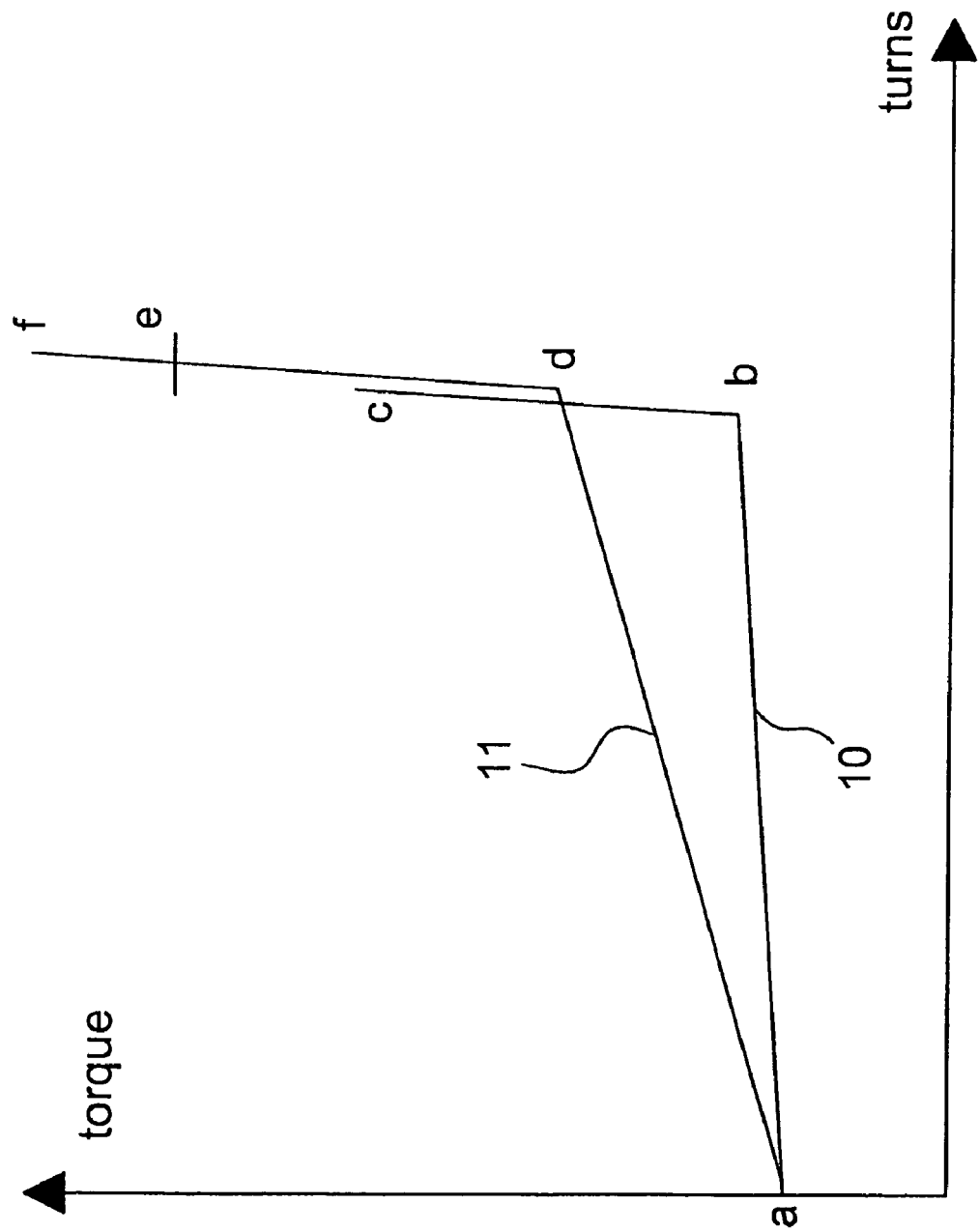
FIG. 3 shows a graph with curves representing the trend of the make up torque applied to the joint of the invention.

With particular reference to the figures, there is shown a threaded joint indicated globally with reference numeral 1, connecting two tubes, a male tube, or pin 2, with a nominal external diameter D, and a female tube or box 3 of nominal external diameter D1.

The pin 2 has a threaded portion 4 with male threads of appropriate profile, e.g. trapezoidal, and the box 3 has an internal threaded portion 5 with female threads of corresponding shape.

The common axis of the pipe and the pin and box is indicated with A.

Design of the thread of the joint is based on the Taguchi method, which uses the theory of orthogonal matrices.

Dr. Taguchi developed a method based on "Orthogonal Array" experiments that gives much-reduced variance for the experiment with optimum settings of control parameters. This method takes advantage of the previous knowledge on the product/process. "Orthogonal Arrays" provide a set of well balanced (minimum) experiments and Dr. Taguchi's Signal-to-Noise ratios (S/N) serve as objective functions for optimization and prediction of optimum results. The signal-to-noise ratio needs to be maximized while minimizing the effects of the noise; the level of noise is shown as an error that should be kept low, otherwise the selection of parameters was incomplete and part of noise is actually a signal that was not properly identified at the beginning of the test.

The parameters to evaluate using the methodology were defined as shown below with two possible states:
  Thread profile radii (0.2, 0.3 mm)
  Thread interference (0.9%, 4% of average thickness of the connection)
  Surface treatment (peened, bare)
  Torque on shoulder (less than 12000 ft-lbs, greater than 18000 ft-lbs) aimed values due to the inertia of the make-up tongs.

The above-mentioned parameters were combined as requested by Taguchi's methodology for Design of experiments using a L8 orthogonal matrix—eight experimental trials. The experiments were performed at two stress levels on a pipe with an external diameter of 244 mm and a thickness of 13.84 mm. Table I summarizes the parameters.

TABLE I

L8 Taguchi matrix and test results

| Test Number | Torque on shoulder (Kft-lbs) | Thread Interference (% diam.) | Radius (mm) | Surface Treatment |
|---|---|---|---|---|
| 1 | <12 | 0.9% | 0.3 | P |
| 2 | <12 | 0.9% | 0.2 | B |
| 3 | <12 | 4% | 0.2 | B |
| 4 | <12 | 4% | 0.3 | P |
| 5 | >18 | 0.9% | 0.3 | B |
| 6 | >18 | 0.9% | 0.2 | P |
| 7 | >18 | 4% | 0.2 | P |
| 8 | >18 | 4% | 0.3 | B |

Figure 4:
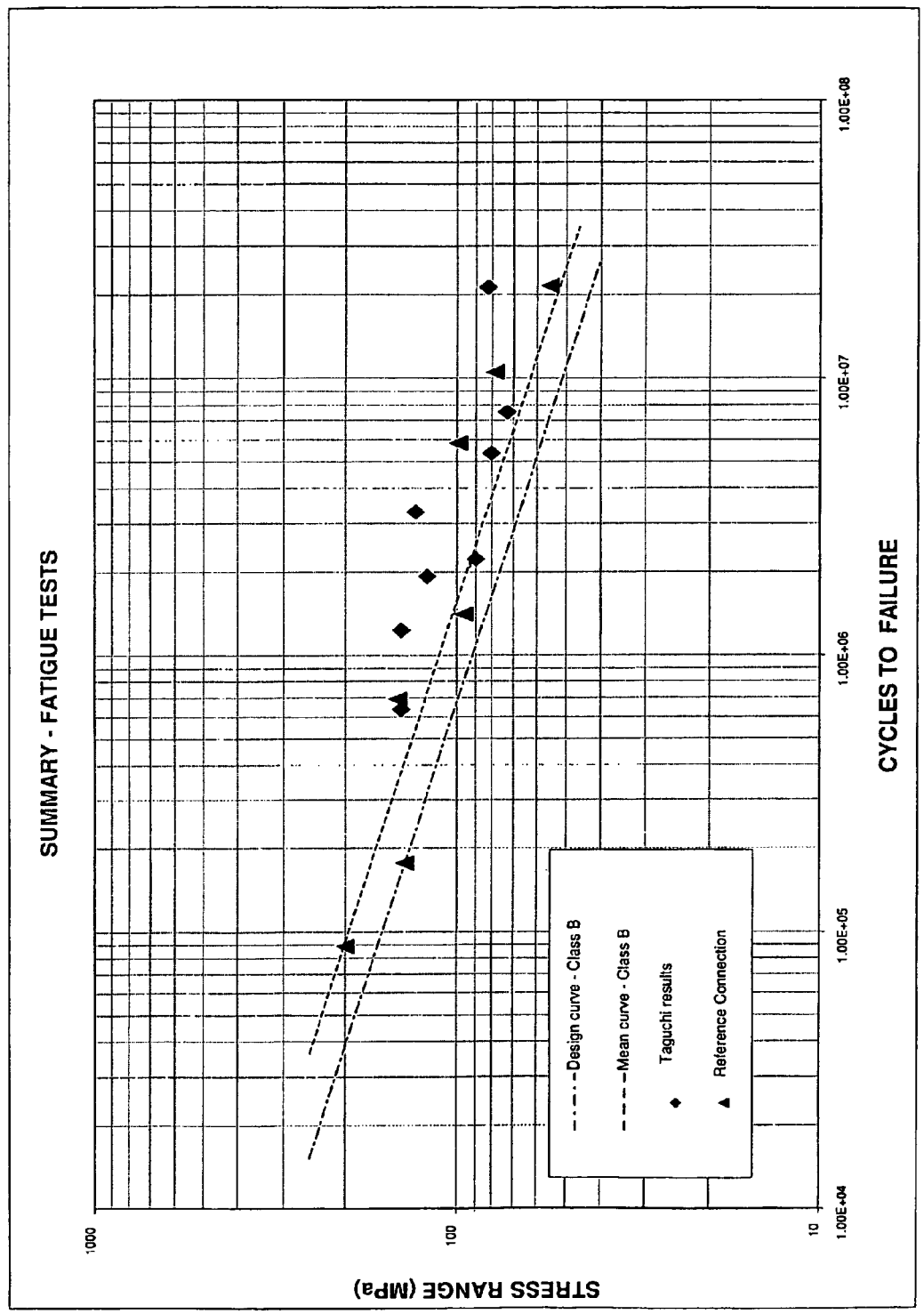
FIG. 4 shows a graph with comparative fatigue test results.

The graph of FIG. 4 shows the difference of a standard connection and the results of the connections manufactured in accordance to the table above. The most effective combination is the use of higher interference, higher energy on the shoulder, a larger radius and the peened surface. The main effects are seen in the area above the fatigue limit of the material, ~90 MPa.

Following this design methodology, while tensile-axial loads are transferred through the usual flank to flank contact, defining an axial interference within values used in the state of the art joints, radial loads in the threads of the joint of the invention to reach values higher than state of the art values, which ensure an improved fatigue resistance.

The magnitude of these radial loads mainly depend on radial geometrical interference which is achieved by appropriately designing the various diameters and tolerances of pin 2 and box 3.

Preferably an enlarged root to load flank radius R improves the joint's fatigue resistance.

For the threads of pin 2 and box 3, in order to bear appropriately the higher stresses originated by the radial interference, the radius R between the load flank and the root is increased, as shown in particular in FIG. 2b.

Tests have shown that the use of thread root-to-crest radial interference produces lower stress concentrations, which explains the provision of the enlarged radius R.

The mentioned high radial tension can be produced either between thread crests of the pin 2 and thread roots of the box 3, leaving a free space between thread roots of the pin 2 and the thread crests of the box 3 (this embodiment is not shown in the figures), or vice versa like shown in FIG. 2b. Also both options can be present at the same time in the same joint.

The radius R can have a maximum value which is limited only by the need to maintain joint tension efficiency, especially in the run out threads. If the radius R is too large, the tendency for disengagement rises.

The value of the radius R has been set around ¼ of the thread height. Due to the possible thread sizes this value can be between 0.2 and 0.4 mm with an optimal value of 0.3 mm.

This value has proven to optimize the threaded joint performance, according to the results of the tests performed.

Additionally a surface hardening treatment like shot peening, nitridizing, carburizing, and cold working is provided to the joint 1. This produces several effects.

Firstly, it provides compression micro pre-loads, which improve fatigue resistance, as shown by well known fatigue analysis. Thus a preferred embodiment of the invention uses shot peening, which guarantees higher pre-loads.

Secondly, the surface treatment increases surface hardness. It is shown, and detailed in cold welding theories, that galling between two different surfaces is reduced if their surface hardness and finishing are different. Such a treatment, when applied to pin 2 or box 3, or in different magnitudes on different joint members to produce different surface properties, or in selected areas of the pin 2 and/or box 3 themselves, preferably the threaded region 4, 5, can also reduce galling tendency and hence the presence of microcracks due to such galling that could detrimentally affect the fatigue performance. For example, phosphatizing one of the surfaces to make it different from the other contributes much to reduce galling. However, phosphatizing alone is effective when high loads are involved and combining it also with a hardening process, such as shot peening, ensures such properties and increases resistance of the joint 1 to high contact pressures.

In a preferred embodiment, such a surface hardening treatment is applied to the pin 2, which is in general more loaded than the box 3, and more specifically to the beginning and end of the threaded zone 4, 5, which are subject to higher stress concentrations. This would provide a more homogeneous stress distribution along the whole thread.

The right process parameters for the shot peening were set after several tests which lead to an optimization of the results.

One of the main process parameters is intensity of the shot peening, which can be measured by the Almen test, standardized by SAEJ442a standard. According to the results of the tests performed, an Almen intensity between 006 A and 015 A is suitable for the invention.

Another important parameter is the diameter of the shots (spherical steel or glass particles), which must be defined according to the geometry of the pieces to be treated. For the present invention, a shot diameter between 0.15 mm and 0.35 mm is suitable.

Advantageously, the threaded joint 1 of the invention can still reach an increased fatigue life when, during make up, an additional axial energization is provided to the joint by inputting high loads in the shoulders 6 and 7 between pin 2 and box 3. This is made by giving the joint 1 an extra make up torque and therefore an extra load on the shoulders 6, 7. This has the surprising effect that an improved fatigue resistance is achieved on the joint 1.

This added load produces an additional compressive effect, tending to tension the box 3 and to compress the pin 2, thus improving fatigue stress resistance. This is achieved by balancing the stress distribution over the complete extension of the joint 1, especially over the pin 2.

With reference to the graph of FIG. 3, there is shown a Cartesian graph where the abscissa axis represents the number of make up turns and the ordinate axis represents torque magnitude. The graph shows two curves 10 and 11.

The curve 10 represents the torque trend for a state of the art joint during make up according to customary practice. Point "a" of the curve 10 shows the starting point for the make up operation. The segment "a-b", shows the gradual increase of torque due to the customary radial interference which is usual in many state of the art joints. The segment "b-c" shows the increase in torque magnitude due to energizing of the abutment shoulders between the pin and box.

The curve 11 shows the trend of the torque that is applied to a joint 1 following the method of invention. The segment "a-d" of the curve shows the gradual increase of the torque having a steeper angle that is caused by the greater radial interference between crests and roots of the threads of the pin 2 and box 3. The curve segment "d-e" represents the sharp increase of torque caused by the energization of the abutment shoulders 6 and 7 up to a magnitude corresponding to a make up made according to customary practice of known make up methods. The segment "e-f" represents the extra torque which is hereafter also called "Δ torque" according to the make up method of the invention.

There are two points worth noticing in analyzing the make-up method of the invention:

1) Torque shoulder point "d", where the slope of the curve increases suddenly, shows that make up has reached the shouldering position where the shoulder 6 of the pin 2 abuts the shoulder 7 of the box 3. This point "d" marks the end of the first part of the curve 11, where thread interference has been the unique resistance to the applied torque.

2) From point "d" to final torque point "f", where make up ends, the curve becomes nearly a vertical line, since torque values increase suddenly in a fraction of a turn compared to the preceding part of the curve. The reason is that an axial interference must be overcome, consuming the corresponding torque energy which will be stored as elastic energy in the joint 1.

The extra torque is applied at the end of the make up of the pin 2 onto the box 3. For example: when a customary make up operation achieves a final torque which produces loads of about 50% of the yield strength, the "Δ torque" applied under the method of the invention increases loads up to an 80% of the yield strength. These values can vary within the whole possible range between 1% and 99%.

For each type of commercial joint specific optimized values have been defined, which have been designed, tested and validated according to the following scheme.

In a first step, joint parameters are taken into account, like diameter, thickness, steel grade, thread type. Optimal make up parameters are pre-estimated, modeled and simulated.

In a second step values are full scale tested and the initial process is retro-fed, in an iterative loop.

As a third and last step, the made up joint undergoes additional validation tests, simulating actual operating conditions in order to validate and qualify the joint 1 and the make up process.

As a consequence of the complexity of the process, make up parameters are not defined in terms of absolute parameters, like diameter or wall thickness of the connection, for example. The Δ A torque or segment "e-f" of curve 11 is defined as an additional torque or an extension of the torque vs. turns curve. As a general rule neither normal torque nor Δ torque exceeds the yield strength of the material in the shoulder region. Advantageously, "Δ torque" is between 10% and 50% of the normal torque or is such that the final torque value, i.e. the normal torque summoned to "Δ torque", is between 50% and 90% of the steel's yield strength. The normal or maximum nominal make up torque is defined by the manufacturers for each specific joint.

The invention is used preferably in the field of OCTG and line pipe connections for the oil & gas industry, specially in offshore applications.

What is claimed is:

1. A threaded joint comprising a male threaded tube, defined as pin, and a female threaded tube, defined as box, the pin being provided with a first abutment shoulder, the box being provided with a second abutment shoulder, said first and second abutment shoulders having complementary shape, the pin being adapted to be made up in the box,
wherein an interference is provided between thread roots of either one of pin or box and thread crests of the other one of pin or box measured according to the nominal dimensions of the pin and box, the value of the interference being comprised between 1% and 5% of the average thickness of the joint,
wherein there is provided a root to load flank radius (R) having a value of around ¼ of the thread height, and
wherein the joint has a surface treatment comprising shot peening applied to the beginning and end of the threaded zone of the pin.

2. A threaded joint according to claim 1, wherein the radius R has a value of between 0.20 and 0.40 mm.

3. A threaded joint according to claim 2, wherein the radius R has a value of 0.30 mm.

4. A threaded joint comprising:
a male threaded pin and a female threaded box, the pin comprising a first abutment shoulder and the box comprising a second abutment shoulder, the first and second abutment shoulders comprising complementary shapes and configured to abut against each other,
the pin configured to be made up in the box, wherein the thread roots of one of the pin and box and thread crests of the other of the pin and box define an interference of between 1% to 5% of the average radial thickness of the joint when the pin is made up in the box,
the pin comprising a root to load flank radius R of about ¼ of the pin thread height, and
one or both of the beginning and end of the threaded zone of the pin comprising a surface treatment.

5. The threaded joint according to claim 4, wherein the radius R is between 0.2 and 0.4 mm.

6. The threaded joint according to claim 5, wherein the radius R is about 0.3 mm.

7. A threaded joint, comprising:
a threaded box configured to couple to a threaded pin to form a threaded joint, the threaded pin comprising a first abutment surface and the threaded box comprising a second abutment surface, the first and second abutment surfaces comprising complementary shapes an configured to abut against each other,
the threads of the pin and the box each comprising a thread height, a thread crest, a thread root, and a thread root to flank radius R comprising about ¼ of the thread height,
the threaded joint defining a radial interference between the thread root of the pin and thread crest of the box or between the thread root of the box and the thread crest of the pin, the interference being between 1% to 5% of the average radial thickness of the joint when the box is coupled to the pin, and
wherein at least one of the pin and the box comprising a surface treatment such that the surface hardness of the pin and the box are dissimilar.

8. The joint of claim 7, wherein the surface treatment comprises shot peening.

9. The joint of claim 8, wherein the shot peening comprises a shot diameter of 0.15 to 0.35 mm.

10. The joint of claim 8, wherein the surface treatment further comprises phosphatizing.

11. The joint of claim 7, wherein the pin and box each have a surface treatment.

12. The joint of claim 7, wherein the pin and box have dissimilar surface treatments.

13. The joint of claim 7, wherein the radius R is between 0.2 and 0.4 mm.

14. The joint of claim 13, wherein the radius R is about 0.3 mm.

* * * * *

UNITED STATES PATENT AND TRADEMARK OFFICE
CERTIFICATE OF CORRECTION

PATENT NO.         : 8,215,680 B2                                   Page 1 of 1
APPLICATION NO.    : 12/673833
DATED              : July 10, 2012
INVENTOR(S)        : Néstor Jesús Santi It is certified that error appears in the above-identified patent and that said Letters Patent is hereby corrected as shown below:

In column 2 at line 55, change "high" to --higher--.

In column 3 at line 64, after "of" delete "the".

In column 4 at approximately line 34, change "a larger" to --larger--.

In column 4 at approximately line 34, change "radius" to --radius,--.

In column 5 at line 22, change "reduce" to --reducing--.

In column 5 at line 23, change "is" to --is not--.

In column 6 at line 4, change "of" to --of the--.

In column 6 at approximately line 55, change "ΔA" to --Δ--.

Signed and Sealed this
Eighteenth Day of December, 2012

David J. Kappos
*Director of the United States Patent and Trademark Office*